(12) United States Patent
Hochstetler et al.

(10) Patent No.: US 10,907,718 B2
(45) Date of Patent: Feb. 2, 2021

(54) CAM LINER FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 309 days.

(21) Appl. No.: 15/874,840

(22) Filed: Jan. 18, 2018

(65) Prior Publication Data

US 2019/0219144 A1    Jul. 18, 2019

(51) Int. Cl.
| | |
|---|---|
| *F03C 2/00* | (2006.01) |
| *F03C 4/00* | (2006.01) |
| *F04C 2/00* | (2006.01) |
| *F04C 15/00* | (2006.01) |
| *F16H 53/02* | (2006.01) |
| *F04B 49/12* | (2006.01) |
| *F04C 2/344* | (2006.01) |

(Continued)

(52) U.S. Cl.
CPC ......... *F16H 53/025* (2013.01); *F01C 21/106* (2013.01); *F04B 49/125* (2013.01); *F04C 2/344* (2013.01); *F04C 2/3442* (2013.01); *F16H 57/0436* (2013.01); *H02K 7/003* (2013.01); *H02K 7/116* (2013.01); *H02K 7/1823* (2013.01); *H02K 15/0006* (2013.01); *F04C 2230/80* (2013.01); *F04C 2250/30* (2013.01); *F16H 48/10* (2013.01); *F16H 2048/104* (2013.01)

(58) Field of Classification Search
CPC .... F04C 2/344; F04C 2/3442; F04C 2230/80; F04C 2250/30; F01C 21/106; F04B 49/125; F16H 48/10; F16H 53/025; F16H 57/0436; F16H 2048/104; H02K 7/003; H02K 7/116; H02K 7/1823; H02K 15/0006
USPC .................................. 418/15, 107, 166, 171
See application file for complete search history.

(56) References Cited

U.S. PATENT DOCUMENTS 2,631,540 A * 3/1953 Baugh ..................... F04C 14/26
                                                                    417/310
3,680,980 A * 8/1972 Bart ........................ F04C 14/26
                                                                    417/310

(Continued)

FOREIGN PATENT DOCUMENTS

| EP | 2202395 | 6/2010 |
|---|---|---|
| EP | 2441915 | 4/2012 |
| EP | 2657574 | 10/2013 |

OTHER PUBLICATIONS

The Extended European Search Report for EP Application No. 19152489.1, dated May 6, 2019.

*Primary Examiner* — Theresa Trieu

(74) *Attorney, Agent, or Firm* — Carlson, Gaskey & Olds, P.C.

(57) ABSTRACT

A cam liner for use in an integrated drive generator has a cam liner body extending between a first end spaced from the second end by a first distance. The body is generally cylindrical. An outer diameter of the cam liner defines a second distance. A ratio of the first distance to the second distance is between 0.90 and 1.00. An integrated drive generator and a method are also disclosed.

3 Claims, 4 Drawing Sheets

(51) Int. Cl.
*H02K 7/18* (2006.01)
*H02K 7/116* (2006.01)
*H02K 15/00* (2006.01)
*H02K 7/00* (2006.01)
*F01C 21/10* (2006.01)
*F16H 57/04* (2010.01)
*F16H 48/10* (2012.01)

(56) References Cited

U.S. PATENT DOCUMENTS

| | | |
|---|---|---|
| 5,402,569 A | 4/1995 | Maki et al. |
| 6,364,630 B1 * | 4/2002 | Craft ................ F04C 14/26 417/310 |
| 2010/0154402 A1 * | 6/2010 | Cho ................ F04C 14/226 418/26 |
| 2012/0156077 A1 | 6/2012 | Dexter et al. |

* cited by examiner

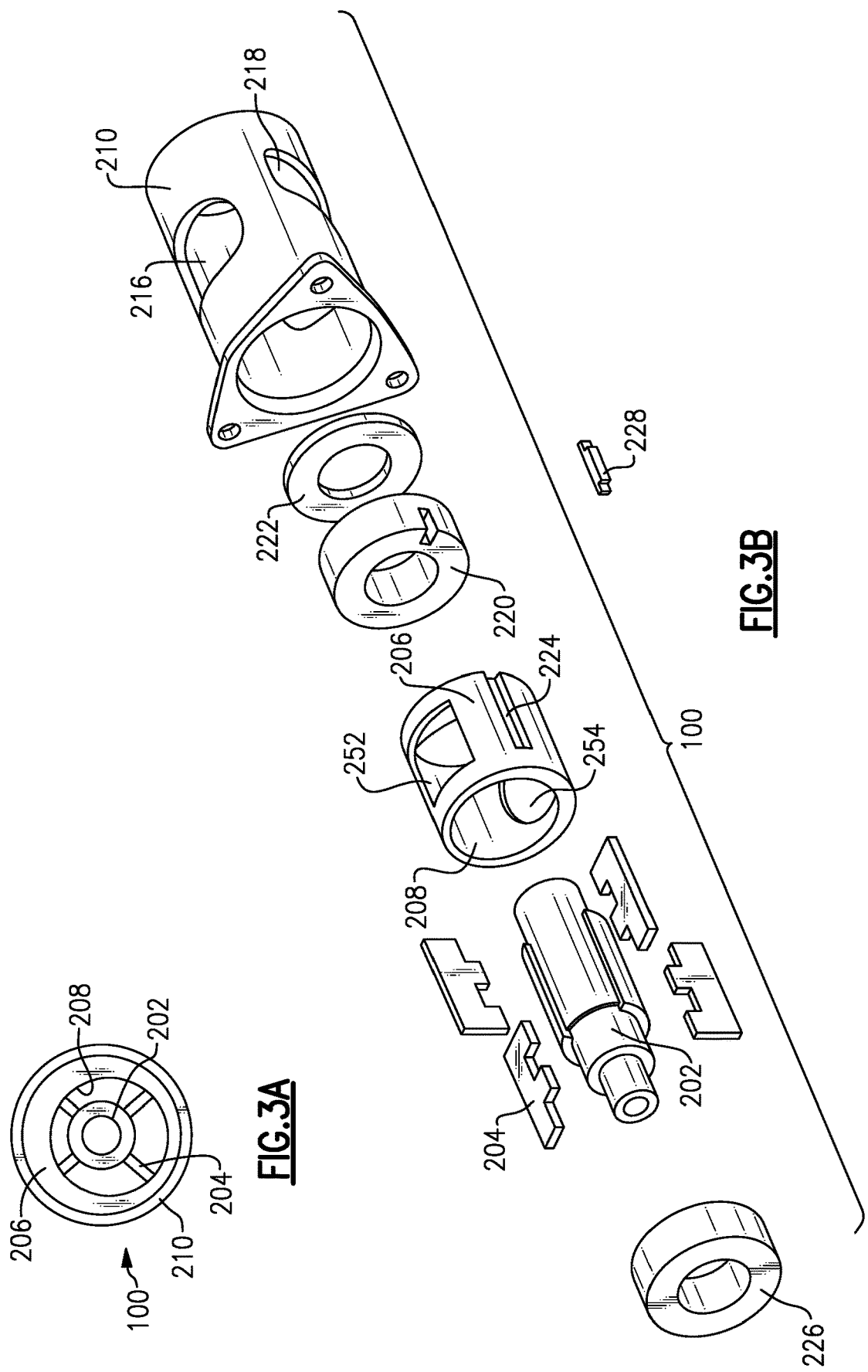

CAM LINER FOR INTEGRATED DRIVE GENERATOR

BACKGROUND

This application relates to a cam liner for an pump in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by differential output ring gear through an accessory drive gear.

One of the pumps is an inversion pump. Another is a charge pump. Cam liners for these pumps raise design challenges.

SUMMARY

A cam liner for use in an integrated drive generator has a cam liner body extending between a first end spaced from the second end by a first distance. The body has a generally cylindrical outer periphery. An outer diameter of the cam liner defines a second distance. A ratio of the first distance to the second distance is between 0.90 and 1.00.

In addition, an integrated drive generator is disclosed as is a method of replacing a cam liner in an integrated drive generator.

These and other features may be best understood from the following drawings and specification.

BRIEF DESCRIPTION OF THE DRAWINGS

FIG. 3A shows a pump.
FIG. 3B is an exploded view of the FIG. 3A pump.

DETAILED DESCRIPTION

Figure 1:
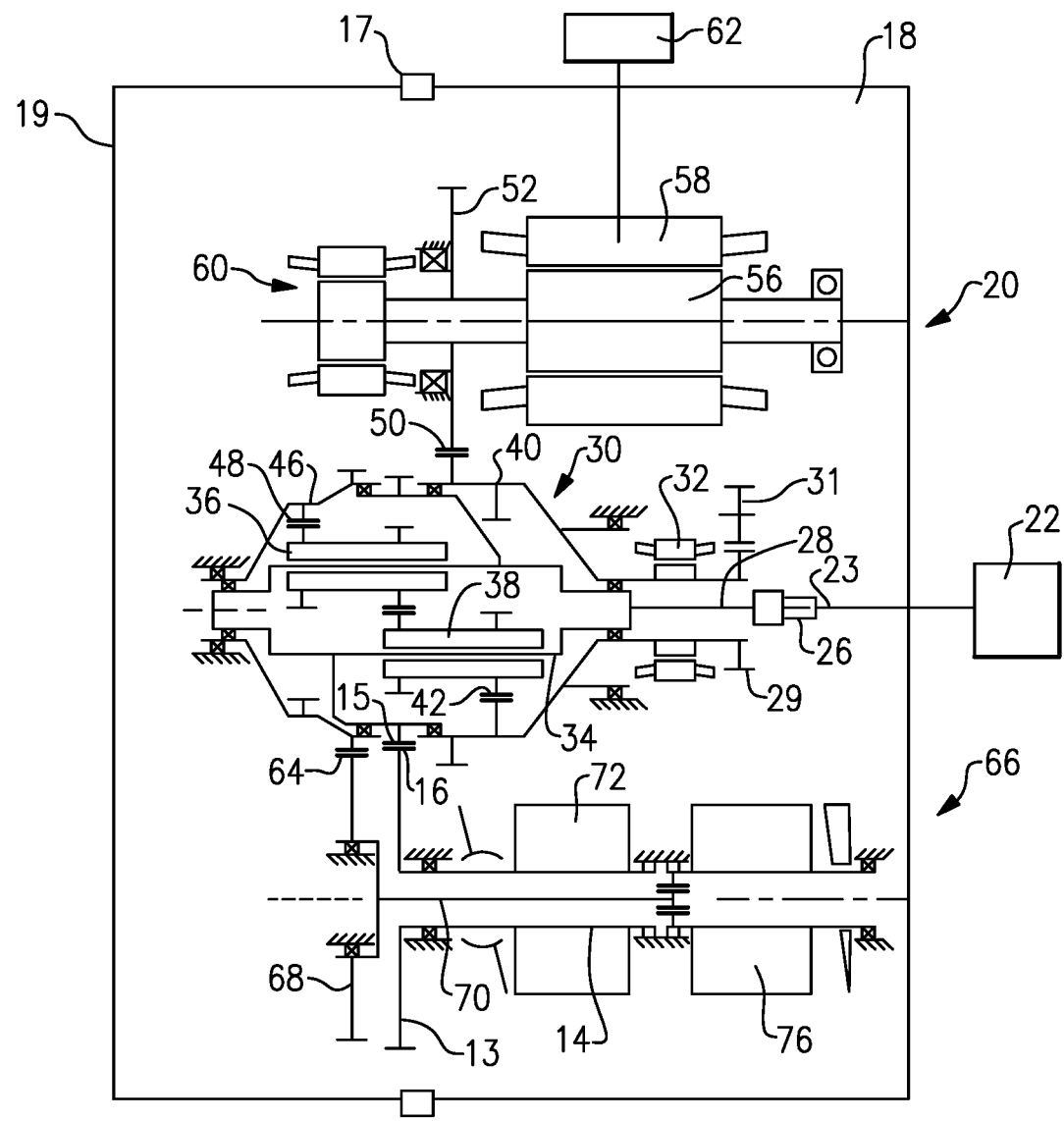
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

A gear 15 that is part of the carrier has a gear interface 16 with a gear 13 driving a shaft 14 also within the speed trimmer.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
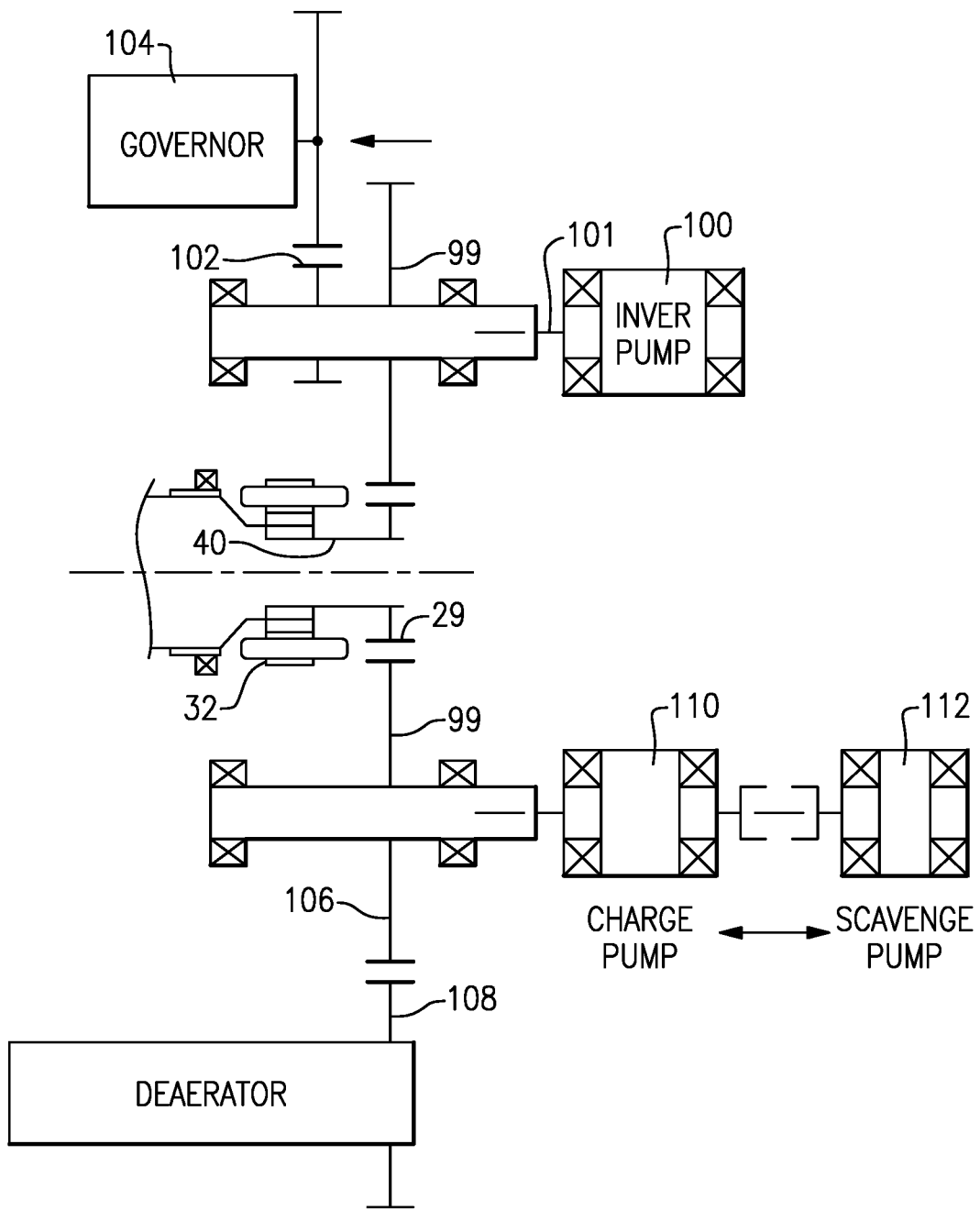
FIG. 2 shows an accessory gear drivetrain.

FIG. 2 shows the accessory drive gear 29. The accessory drive gear 29 drives a pair of driven gears 99. These driven gears were shown schematically as gear 31 in FIG. 1. One gear 99 drives a second gear 102 which, in turn, drives a governor 104. The gear 99 also drives an inversion pump 100 through a shaft 101. The second gear 99 drives a deaerator through gear 108, as well as a charge pump 110 and a scavenge pump 112.

The inversion pump 100 is illustrated in FIG. 3A. A pump shaft 202 is driven by gear 99, and carries a plurality of vanes 204. The vanes rotate within a cam liner 206 having an inner cam surface 208. An outer pump sleeve 210 is also illustrated.

As shown in the exploded view of FIG. 3B, the pump 100 includes the pump shaft 202, the vanes 204, the cam liner 206 and the sleeve 210. As can be seen, the sleeve 210 has opposed windows 216 and 218 which provide inlet and outlet ports into the pump 200. The cam 206 has mating windows 216 and 218. Bearings 220 and 226 are positioned at each end of the cam.

A plurality of Belleville spring washers, 222, provides a bias force. As shown, the cam 206 includes a keyway 224 and the sleeve 210 includes a mating keyway (now shown). The key 228 locks the two together to prevent rotation.

The charge pump 110 has the same geared structure.

Figure 4A:
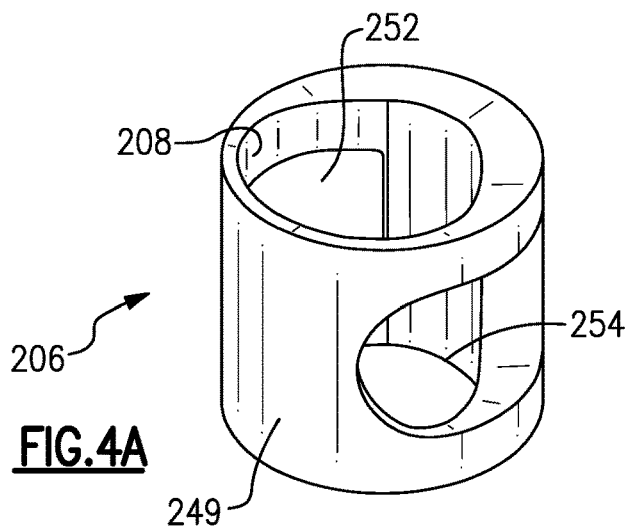
FIG. 4A shows a cam liner.

FIG. 4A shows a cam liner 206 having a cam surface 208. Windows 252 and 254 provide inlet and outlet ports into pump chambers for the vane pump. The cam liner 206 has a cam liner body 249. The cam liner 206 can be used in either inversion pump 100 or charge pump 110.

Figure 4B:
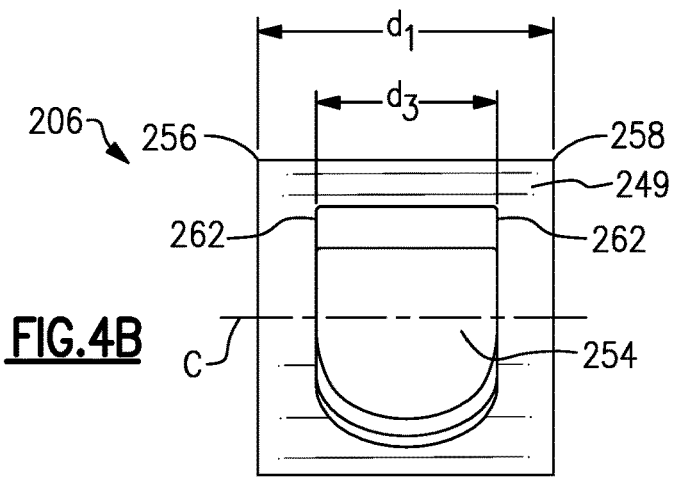
FIG. 4B is a side view of a cam liner.

As shown in FIG. 4B, the body 249 extends between ends 256 and 258. The ends 256 and 258 are spaced by a distance $d_1$ along a central axis C of the body 249.

Figure 4C:
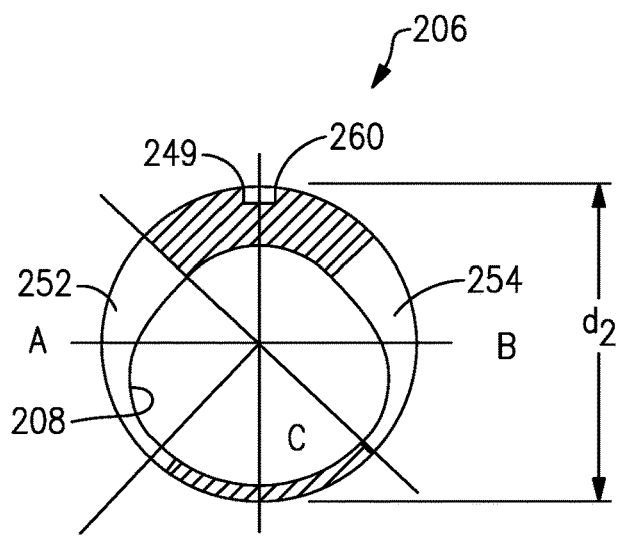
FIG. 4C is a cross-sectional view of a cam liner.

FIG. 4C is a cross-sectional view through the body 249. As shown, a diameter to a cylindrical outer peripheral surface 260 is defined as a second distance $d_2$.

In embodiments, $d_1$ was 1.302 inches (3.307 cm) and $d_2$ was 1.374 inches (3.490 cm). As also shown in FIG. 4B, the windows 254 (and 252) extend between ends 262 for a third distance $d_3$ measured along axis C.

As also shown in FIG. 4C, window 252 extends for a circumferential range across an angle A. Window 254 extends for a circumferential range across an angle B. In one embodiment, angle A was 100 degrees and in embodiments, angle A is between 95 and 105 degrees. In the same embodiment, angle B was 90 degrees and in embodiments, angle B is between 85 and 90 degrees.

A ratio of $d_1$ to $d_2$ is between 0.90 and 1.00 in embodiments of this disclosure. In embodiments, a ratio of $d_1$ to $d_3$ is between 1.20 and 1.40. These dimensions should come with a tolerance range of +/−0.010 inch (0.025 cm).

A method of replacing a cam liner in an integrated drive generator includes the steps of removing an existing cam liner from one of an inversion pump and a charger pump in an integrated drive generator. The integrated drive generator has an input shaft, a gear differential including a carrier shaft to be driven by the input shaft and including a ring gear for driving a generator. The ring gear is also connected to drive an accessory drive gear, which is connected to drive the one pump through an intermediate gear. The one pump includes a driven shaft, a plurality of vanes, the existing cam liner and an outer pump sleeve. The existing cam liner is replaced with a replacement cam liner including a cam liner body extending between a first end spaced from a second end by a first distance, and the body having a generally cylindrical outer peripheral surface. An outer diameter of the cam liner defines a second distance. A ratio of the first distance to the second distance is between 0.90 and 1.00.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A cam liner for use in an integrated drive generator comprising:

a cam liner body having a central axis extending between a first end spaced from a second end by a first axial distance, and said body having a generally cylindrical outer periphery, an outer diameter of said cam liner from said central axis defining a second distance, and a ratio of said first distance to said second distance being between 0.90 and 1.00;

wherein said cam liner having two circumferentially spaced windows to provide fluid ports and each of said fluid windows extending for a third distance measured along a central axis of said cylindrical outer periphery, and a ratio of said first distance to said third distance being between 1.20 and 1.40;

wherein said windows extend between two circumferential ends defined in a circumferential diameter relative to said end, and one of said windows extending for between 95 and 105 degrees and a second of said windows extending for between 85 and 95 degrees in said circumferential direction;

wherein said cam liner body has a keyway; and wherein said first distance is 1.3 inches, and said second distance is 1.37 inches.

2. An integrated drive generator comprising:

an input shaft, a gear differential including a carrier shaft to be driven by said input shaft and including a ring gear for driving a generator;

said ring gear also connected to drive an accessory drive gear, said accessory drive gear connected to drive at least one of an inversion pump and a charge pump through an intermediate gear, said one of said inversion pump and said charge pump including a driven shaft, a plurality of vanes, a cam liner and an outer pump sleeve; and said cam liner including a cam liner body extending between a first end spaced from a second end by a first distance, and said body having a generally cylindrical outer periphery, an outer diameter of said cam liner defining a second distance, and a ratio of said first distance to said second distance being between 0.90 and 1.00;

wherein said cam liner having two circumferentially spaced windows to provide fluid ports and each of said fluid windows extending for a third distance measured along a central axis of said cylindrical outer periphery, and a ratio of said first distance to said third distance being between 1.20 and 1.40;

wherein said windows extend between two circumferential ends defined in a circumferential diameter relative to said end, and one of said windows extending for between 95 and 105 degrees and a second of said windows extending for between 85 and 95 degrees in said circumferential direction;

wherein said cam liner body has a keyway; and wherein said first distance is 1.3 inches, and said second distance is 1.37 inches.

3. A method of replacing a cam liner in an integrated drive generator comprising the steps of:

removing an existing cam liner from one of an inversion pump and a charge pump in an integrated drive generator, said integrated drive generator having an input shaft, a gear differential including a carrier shaft to be driven by said input shaft and including a ring gear for driving a generator;

said ring gear also connected to drive an accessory drive gear, said accessory drive gear connected to drive one of said inversion pump and said charge pump through an intermediate gear, said one of said inversion pump and said charge pump including a driven shaft, a plurality of vanes, said existing cam liner and an outer pump sleeve; and replacing said existing cam liner with a replacement cam liner including a cam liner body extending between a first end spaced from a second end by a first distance, and said body having a generally cylindrical outer peripheral surface, an outer diameter of said cam liner defining a second distance, and a ratio of said first distance to said second distance being between 0.90 and 1.00;

wherein said cam liner having two circumferentially spaced windows to provide fluid ports and each of said fluid windows extending for a third distance measured along a central axis of said cylindrical outer periphery, and a ratio of said first distance to said third distance being between 1.20 and 1.40;

wherein said windows extend between two circumferential ends defined in a circumferential diameter relative to said end, and one of said windows extending for between 95 and 105 degrees and a second of said windows extending for between 85 and 95 degrees in said circumferential direction;

wherein said cam liner body has a keyway; and wherein said first distance is 1.3 inches, and said second distance is 1.37 inches.

\* \* \* \* \*